H. AND J. P. GARNER.
WHEEL OF MOTOR TRACTOR.
APPLICATION FILED AUG. 13, 1919.
1,401,530.
Patented Dec. 27, 1921.
2 SHEETS—SHEET 1.
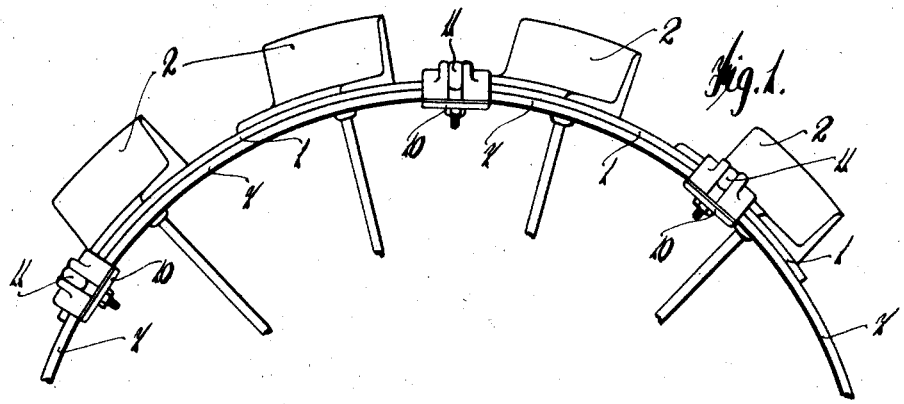
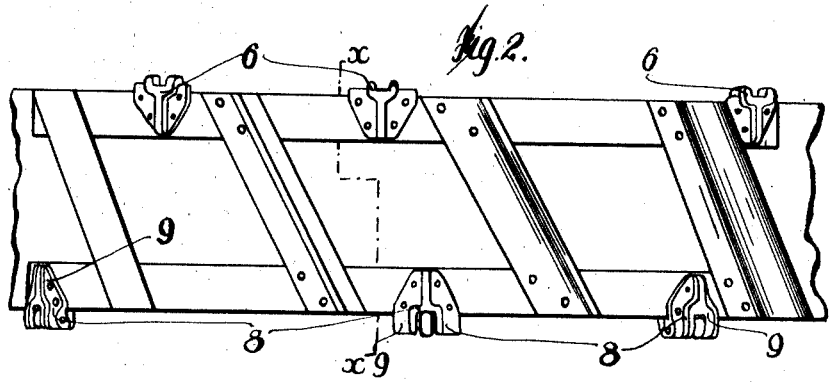
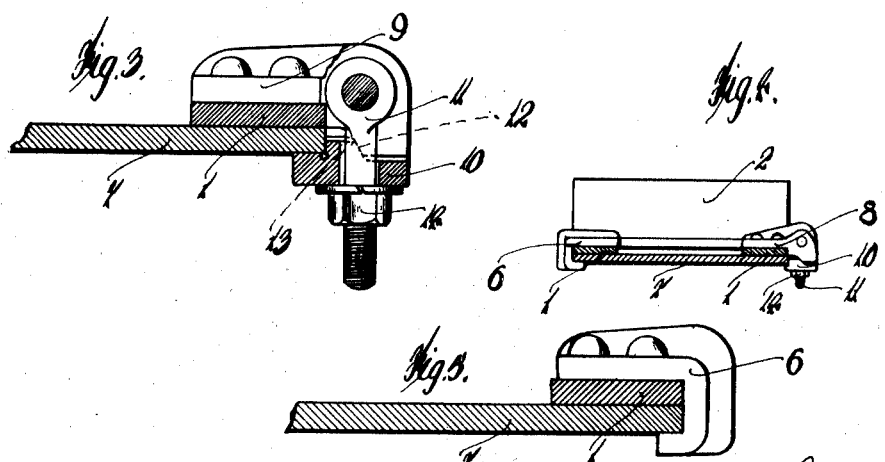

H. AND J. P. GARNER.
WHEEL OF MOTOR TRACTOR.
APPLICATION FILED AUG. 13, 1919.

1,401,530.

Patented Dec. 27, 1921.
2 SHEETS—SHEET 2.

Inventors
Henry Garner &
James Parker Garner
By
B. Singer, Atty.

UNITED STATES PATENT OFFICE.

HENRY GARNER AND JAMES PARKER GARNER, OF BIRMINGHAM, ENGLAND.

WHEEL OF MOTOR-TRACTORS.

1,401,530. Specification of Letters Patent. Patented Dec. 27, 1921.

Application filed August 13, 1919. Serial No. 317,267.

*To all whom it may concern:*

Be it known that we, HENRY GARNER and JAMES PARKER GARNER, subjects of the King of Great Britain, residing at "Avalon," Wake Green Road, Moseley, Birmingham, in the county of Warwick, England, and 210 Showell Green Lane, Sparkhill, Birmingham, aforesaid, respectively, have invented a new and useful Improvement Relating to the Wheels of Motor-Tractors; and we do hereby declare the following to be a full, clear, and exact description of the same.

Our invention comprises improvements relating to the wheels of motor tractors and refers more particularly to that class of such which are designed for agricultural purposes and which are provided with supplementary rims made in sectional lengths and provided with gripping media, said supplementary rims being adapted to be detachably secured to the main rim of the wheel.

In this class of device it has in the past been the common practice to secure the sections of the supplementary rim to the wheel by bolts, the sections being made of channel section or provided with channel shaped retaining members and the bolts passing through the parallel sides of the channels in a direction parallel to the axis of the wheel.

One of the objects of our invention is to provide improved retaining means for the supplementary rim sections and in accordance therewith the sections are provided at one edge with fixed hook members adapted to hook over the inner edge of the main rim, and at the opposite edge of each section are provided movable hook-like clamps adapted to engage with the outer edge of the main rim.

This arrangement has the advantages that it is extremely simple of operation, there being no bolt holes to adjust into register; and it is free from loose parts as the securing nuts employed need not be completely removed from their screws when releasing the clamp.

Moreover by providing securing means of this kind which can be manipulated without difficulty, supplementary rim sections having various kinds of gripping media may be carried, some of which may include metal strakes suitable for soft agricultural land and others may include rubber studs or their equivalent to enable the tractor to run satisfactorily upon hard road surfaces, and these sections may be secured to or removed from the road wheels without difficulty as the conditions may require.

Referring to the drawings:—

Figure 1 is a view in side elevation illustrating one form of the invention.

Fig. 2 is a plan.

Fig. 3 is a sectional end elevation of one of the clamps.

Fig. 4 is a section on line X—X in Fig. 2.

Fig. 5 is an end view of one of the fixed hooks.

Figure 6:
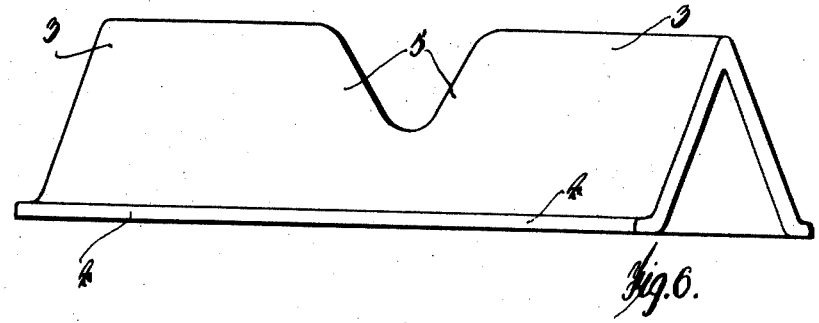
Fig. 6 is an end view of a modified form of strake.
Figure 8:
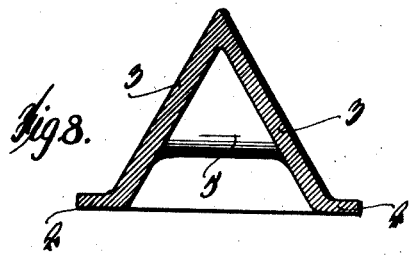
Fig. 8 is a view in section upon line Y—Y of either Fig. 6 or Fig. 7.
Figure 7:
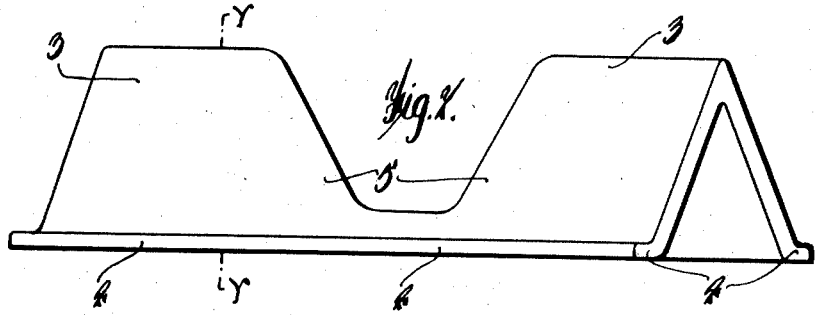
Fig. 7 is an end view of another modified form of strake.
Figure 9:
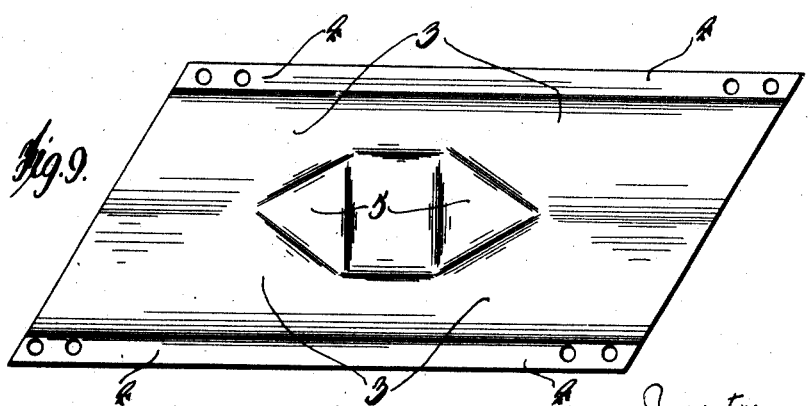
Fig. 9 is a plan of the strake shown in Fig. 7.

The supplemental rim is preferably of skeleton form comprising two narrow strips or bands 1, 1 bent to the curvature of the road rim and connected by inclined gripping media which may conveniently take the form of the angle iron strakes 2 shown in Figs. 1 and 2 or wedge shaped strakes 3, as shown in Figs. 6 to 9, which are a combination of the well-known wedge shaped spud and the angle iron strake. These wedge shaped strakes 3 are of improved and cheaper form, and may be made from rolled metal of inverted V section, the extremities of the two diverging limbs of the V being provided with flanges 4 whereby they are riveted at the desired angle to the two narrow strips 1, thereby providing a skeleton structure comparatively light in weight which can be readily handled when converting the tractor.

The strakes 3 may be provided with a depression as shown at 5, in Figs. 6 to 9, at about the center of the ridge and instead of being made from rolled metal they may be pressed from sheet, cast or forged.

The fixed hooks 6 are secured to one of the bands 1 and are arranged to embrace the inner edge of the road rim 7, these hooks 6 being preferably made of malleable castings or forgings.

The movable clamps 8 are secured to the second supplemental band portion 1 and comprise a fixed portion 9 riveted to the band 1. To this fixed portion 9 is pivoted a movable part 10, preferably by means of a screwed eye bolt 11. The movable jaw 10 is provided with a projecting part or parts 12 preferably of tapered or wedge form which engages a corresponding recess or recesses 13 in the fixed part 9 so as to positively lock said movable part 10 against angular movement when screwed up tight by means of a controlling nut 14 carried by the pivoted eye bolt 11. Thus the parts cannot be disconnected until the nut 14 has been retracted sufficiently to disengage the interlocking parts 12, 13 of the movable jaw and fixed member.

As previously stated, the supplemental rim 1 with its gripping media 2 or 3 is made in sectional lengths, three such lengths being a convenient number, i. e. each length would extend around one third of the circumference of the road rim 7. By this means the part of the rim 1 to be handled would be comparatively light in weight as compared with a complete rim, the various parts can be readily stored one on top of the other in a minimum compass, and further, if one or two lengths be secured to the wheel the tractor would then be slightly advanced so as to expose the remaining portion of the road rim to enable the remaining section or sections of the supplemental rim to be secured without necessitating the jacking up of the tractor.

Instead of carrying soft land gripping media such as 2 or 3 upon the supplemental rim 1, rubber studs or the like may be carried by it. A tractor wheel is permanently adapted to take a sufficient grip of the road to haul its own weight, but it may be required to increase the grip when hauling heavy loads. For this purpose similar detachable rim sections may be employed but carrying rubber studs or equivalent road gripping devices instead of soft land gripping media; or interchangeable with sections carrying the latter.

What we claim then is:—

1. In a wheel, the combination of a main rim, a supplementary rim in sectional lengths adapted to fit around said main rim, hook shaped clamps on one edge of one of said rims and adapted to embrace the edge of the other rim, brackets on one of said rims and having abutments, screws on said brackets, and clamps carried by said screws, having inclined parts and coacting with said bracket abutments in such manner as to wedge between the edge of one of said rims and said bracket abutments, for the purpose specified.

2. In a motor tractor driving element, a main rim, a supplementary rim formed in sectional lengths, clamps on one edge of one rim adapted to engage the adjacent edge of the other rim, brackets on the opposite edge of the one rim, abutments on said brackets, radially movable clamps carried by said brackets and having two sides at least one of which is an inclined surface, one of said sides engaging said abutment for the purpose of restraining the clamp against lateral movement and the other side engaging the edge of said second rim for the purpose of shifting said rim laterally against the clamps on the rim and radially against the second rim, and means for effecting the radial movement of said clamps.

3. In a wheel, the combination of a main rim, a supplementary rim, clamps on one edge of one rim adapted to engage the engaging edge of the other rim, in sectional lengths adapted to be secured around the main rim, an abutment on said rim, pivoted screws attached to one of said rims, securing clamps upon said screws, said clamps being mounted for movement either radially or transversely with respect to the wheel and engaging with said abutment and with the edge of the other rim.

4. In a motor tractor driving element, a main traction member, supplementary land gripping members in sectional lengths and a securing device for securing each sectional length to the main traction member comprising clamps on one edge of said members adapted to engage the adjacent edge of the other of said members, a movable wedge shaped clamp adjustably secured upon the opposite edge of one of said members, and means for moving the converging sides of said clamp into a wedge shaped recess formed between said main traction member and each supplementary land gripping sectional length, whereby the main traction member and the supplementary land gripping sections are held together against radial or transverse displacement.

5. In a motor tractor driving element, a main traction element, and a supplementary land gripping element thereon, securing means on one of said elements for engaging opposite sides of the other of said elements, said securing means including a bracket on one of said elements presenting a side spaced from and opposed to one side of the other of said elements, a jaw having two opposite sides for engagement with said bracket side and said side of said element, one of said four sides being inclined, and means to detachably secure said jaw in place.

6. In a motor tractor driving element, a main traction element, and a supplementary land gripping element thereon having securing means on one of said elements for engaging opposite sides of the other of said elements, said securing means comprising a bracket having a portion spaced from one side of the other of said elements, a bolt pivotally connected to said bracket, and a jaw movable on said bolt for arrangement between said side of the main element and said portion of the bracket.

In testimony whereof we affix our signatures.

HENRY GARNER.
JAMES PARKER GARNER.